(12) United States Patent
Wilson et al.

(10) Patent No.: US 9,978,183 B2
(45) Date of Patent: May 22, 2018

(54) VIDEO SYSTEM, VIDEO GENERATING METHOD, VIDEO DISTRIBUTION METHOD, VIDEO GENERATING PROGRAM, AND VIDEO DISTRIBUTION PROGRAM

(71) Applicant: FOVE, INC., San Mateo, CA (US)

(72) Inventors: Lochlainn Wilson, Tokyo (JP); Keiichi Seko, Tokyo (JP); Yuka Kojima, Tokyo (JP); Yamato Kaneko, Tokyo (JP); Genki Sano, Tokyo (JP)

(73) Assignee: FOVE, INC., San Mateo, CA (US)

( * ) Notice: Subject to any disclaimer, the term of this patent is extended or adjusted under 35 U.S.C. 154(b) by 0 days. days.

(21) Appl. No.: 15/267,917

(22) Filed: Sep. 16, 2016

(65) Prior Publication Data
US 2017/0084083 A1 Mar. 23, 2017

(30) Foreign Application Priority Data

Sep. 18, 2015 (JP) ..................... PCT/JP2015/076765
Sep. 15, 2016 (JP) ................................. 2016-180680

(51) Int. Cl.
*G06T 19/00* (2011.01)
*G06F 3/01* (2006.01)
(Continued)

(52) U.S. Cl.
CPC ............ *G06T 19/006* (2013.01); *G06F 3/013* (2013.01); *G06F 3/147* (2013.01); *G06K 9/0061* (2013.01); *G06K 9/00335* (2013.01); *G09G 5/00* (2013.01); *G09G 5/003* (2013.01); *G09G 5/026* (2013.01); *H04N 21/4122* (2013.01);
(Continued)

(58) Field of Classification Search
CPC .......... G02B 27/017; G02B 2027/0178; G02B 27/0172; G06T 19/006; G06F 3/013; G06F 3/011; G06F 3/017; G06F 3/012; H04N 13/0484; H04N 13/0468
See application file for complete search history.

(56) References Cited

U.S. PATENT DOCUMENTS

| 2015/0235461 A1* | 8/2015 | Schowengerdt ...... G06T 19/006 345/156 |
| 2017/0091549 A1* | 3/2017 | Gustafsson ........ G06K 9/00604 |

* cited by examiner

*Primary Examiner* — Jeffrey Chow
(74) *Attorney, Agent, or Firm* — Venable LLP; Michael A. Sartori; Laura G. Remus

(57) ABSTRACT

Appropriate reduction of transferred data volume is used to deliver interruption-free video to a user, minimizing viewing discomfort. A head-mounted display secured to the head of a user and a video generating device that generates a video for presentation to the user by the head-mounted display are combined in a video system. In the head-mounted display, a presentation unit presents the video to the user, an imaging unit captures an image of the user's eye, the first communication unit sends the captured image to the video generating device, and receives the video from the video generating device. In the video generating device, a second communication unit receives captured images from the head-mounted display and sends a video to the head-mounted-display, a gaze point acquisition unit acquires, based on the captured images, the gaze point of the user in the video, a calculation unit defines a designated region based on the acquired gaze point, and generates the video, wherein the data volume per unit pixel count used for the exterior of the designated region is reduced compared to the data volume used for the interior of the designated region.

18 Claims, 13 Drawing Sheets

(51) Int. Cl.
    *G06K 9/00*           (2006.01)
    *G09G 5/00*           (2006.01)
    *H04N 21/41*          (2011.01)
    *H04N 21/422*         (2011.01)
    *H04N 21/4363*        (2011.01)
    *H04N 21/4402*        (2011.01)
    *H04N 21/4728*        (2011.01)
    *H04N 21/6587*        (2011.01)
    *G06F 3/147*          (2006.01)
    *G09G 5/02*           (2006.01)

(52) U.S. Cl.
    CPC . *H04N 21/42202* (2013.01); *H04N 21/43637* (2013.01); *H04N 21/440245* (2013.01); *H04N 21/4728* (2013.01); *H04N 21/6587* (2013.01); *G09G 2340/045* (2013.01); *G09G 2340/14* (2013.01); *G09G 2370/16* (2013.01)

(a)

(b)

VIDEO SYSTEM, VIDEO GENERATING METHOD, VIDEO DISTRIBUTION METHOD, VIDEO GENERATING PROGRAM, AND VIDEO DISTRIBUTION PROGRAM

TECHNICAL FIELD

The present invention relates to a video system, a video generating method, a video distribution method, a video generating program, and a video distribution program, particularly in the context of a video system comprising a head-mounted display and a video generating device.

BACKGROUND ART

A video is shown on a screen placed in close proximity to the eyes of a user while the user is wearing a head-mounted display. The user cannot see anything except the displayed video image while wearing the head-mounted display and can therefore enjoy the feeling of unity with a virtual space. Technologies related to the above, disclosed in patent document 1, comprise a video generating method and a video generating device that is capable of detecting the movement of a user and displaying on a head-mounted display an image that corresponds to the user's movements.

PATENT REFERENCES

Patent document 1: JP Application No. H02-264632

SUMMARY OF THE INVENTION

Problems Solved by the Invention

Using the above-mentioned technologies, a head-mounted display can show on a screen a video that corresponds to the user's gaze direction. However, in most cases, the video displayed on the head-mounted display constitutes moving pictures. Due to this, the data volume is large and if the video is transmitted 'as is' from the video generating device to the head-mounted display, the image updates may be delayed and possible video interruption should be considered. Also, with the recent proliferation of high-definition monitors, processing of large volumes of video data is required. Considering the video data transfer, although it is possible to combine the video generating device and the head-mounted display in a single unit, reducing the size is desirable for a head-mounted display worn by a user, making integration in a housing difficult. In practice, therefore, the video generating device and the head-mounted display use a wireless or other connection but, since the video data volume is large, there is a possibility that the video delivery may have interruptions.

Also, in case of video delivery of moving pictures for 360 degree whole-sky video, when the video displayed on the screen of the head-mounted display corresponds to the user's gaze direction, transmitting data for the area that the user is not looking at increases the video data volume and may lead to interruption of the video delivery.

The present invention has been made in consideration of such problems, the purpose being to provide technology related to a video system that is capable of inhibiting the communication delay between the head-mounted display and the video generating device.

Means of Solving the Problem

As a solution to the above problem, an embodiment of the present invention is a video system comprising a head-mounted display used while secured to the head of a user, and a video generating device that generates a video presented to the user by the head-mounted display. In this video system, the head-mounted display comprises a video presentation unit for presenting a video to the user, an imaging unit for capturing images of the user's eye, and a first communication unit for sending images captured by the imaging unit to the video generating device and receiving from the video generating device video for presentation by the video presentation unit. The video generating device comprises a second communication unit for receiving from the head-mounted display images captured by the imaging unit and sending video to the head-mounted display, a gaze point acquisition unit for acquiring, based on images captured by the imaging unit, the user's gaze point in the video, and a calculation unit for generating the video, wherein based on the gaze point acquired by the gaze point acquisition unit and using the gaze point as a reference, a designated region is set, and the video is generated with a reduced data volume per unit pixel count outside of the designated region, compared to the video calculated for the inside of the designated region.

The video generating device further comprises a first communication evaluation unit for evaluating the communications environment between the first communication unit and the second communication unit, wherein the calculation unit can, in case the communications environment deteriorates, reduce the data volume of the video compared to the data volume used when the communication environment is good.

The first communication evaluation may evaluate the communications environment on the basis of information combining the latest data on one or more communication parameters, comprising field strength, communication speed, data loss rate, throughput, noise level, and the physical distance from a router.

The video generating device further comprises a gaze point motion acquisition unit for detecting, based on the gaze point acquired by the gaze point acquisition unit, the motion of the user's gaze point, wherein the calculation unit can change at least one of the designated region's size or shape, depending on the motion of the gaze point.

The calculation unit, configured for the designated region's shape to have a major axis and a minor axis or a long edge and a short edge, may set the major axis or the long edge direction of the designated region according to the gaze point motion direction.

Outside of the designated region, the calculation unit may generate the video such that the data volume per unit pixel count changes, depending on the distance from the gaze point.

The calculation unit may successively reduce the generated video data volume per unit pixel count outside the designated region as the distance from the gaze point becomes larger.

The calculation unit may generate the video for which the data volume per unit pixel count is not allowed to fall below a lower limit.

Additionally, optional combinations of the aforementioned constituting elements, and implementations of the invention in the form of methods, apparatuses, systems, recording media, and computer programs may also be practiced as additional modes of the present invention.

Advantage of the Present Invention

According to the present invention, a video system comprising a head-mounted display can appropriately reduce the communication data volume, thereby eliminating interruptions in video delivery and minimizing the sense of discomfort for the user.

DETAILED DESCRIPTION OF THE EMBODIMENTS

In the following, each embodiment of the video system is explained in reference to the drawings. In the following explanations, identical components are referred to by the same symbols, repeated explanations are omitted.

Figure 1:
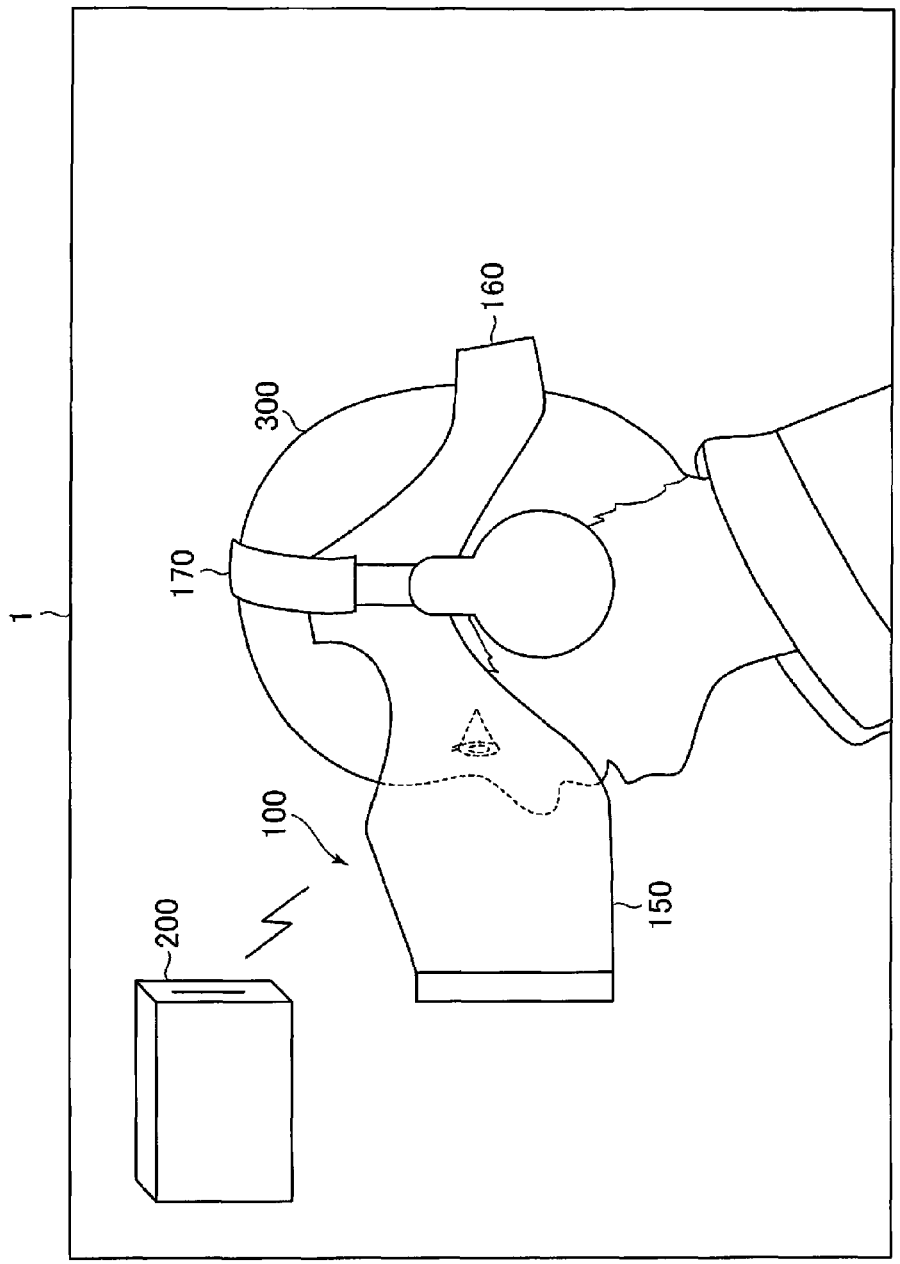
FIG. 1 is a schematic outline diagram of the video system according to the first embodiment.

An outline of the first embodiment of the present invention will be hereinafter described. FIG. 1 shows a schematic overview of the video system 1 according to the first embodiment. According to the embodiments, video system 1 comprises a head-mounted display 100 and video generating device 200. As shown in FIG. 1, the head-mounted display 100 is used while secured to the head of the user 300.

The video generating device 200 generates the video presented to the user by the head-mounted display 100. For example, the video generating device 200 can be used to reproduce video on, but not particularly limited to, stationary game machines, portable game machines, personal computers, tablets, smartphones, phablets, video players, televisions, etc. The video generating device 200 is connected to the head-mounted display 100 over a wireless or a wired connection. In the example shown in FIG. 1, the video generating device 200 is wirelessly connected to the head-mounted display 100. The wireless connection between the video generating device 200 and the head-mounted display 100 may be implemented using existing wireless communication technologies such as Wi-Fi (registered trademark) or Bluetooth (registered trademark). Video image transfer between the head-mounted display 100 and the video generating device 200 may be implemented using, for example, but not particularly limited to, Miracast (registered trademark), WiGig (registered trademark), WHDI (registered trademark) or other communication standards.

The head-mounted display 100 comprises a housing 150, a fitting harness 160, and headphones 170. The housing 150 encloses an image display system, such as an image display element for presenting video images to the user 300, and, not shown in the figure, a Wi-Fi (registered trademark) module, a Bluetooth (registered trademark) module, or other type wireless communication module. The head-mounted display 100 is secured to the head of the user 300 with a fitting harness 160. The fitting harness 160 may be implemented with the help of, for example, belts or elastic bands. When the user 300 secures the head-mounted display 100 with the fitting harness 160, the housing 150 is in a position where the eyes of the user 300 are covered. Thus, when the user 300 wears the head-mounted display 100, the field of view of the user 300 is covered by the housing 150.

The headphones 170 output the audio of the video reproduced by the video generating device 200. The headphones 170 do not need to be fixed to the head-mounted display 100. Even when the head-mounted display 100 is secured with the fitting harness 160, the user 300 may freely put on or remove the headphones 170.

Figure 2:
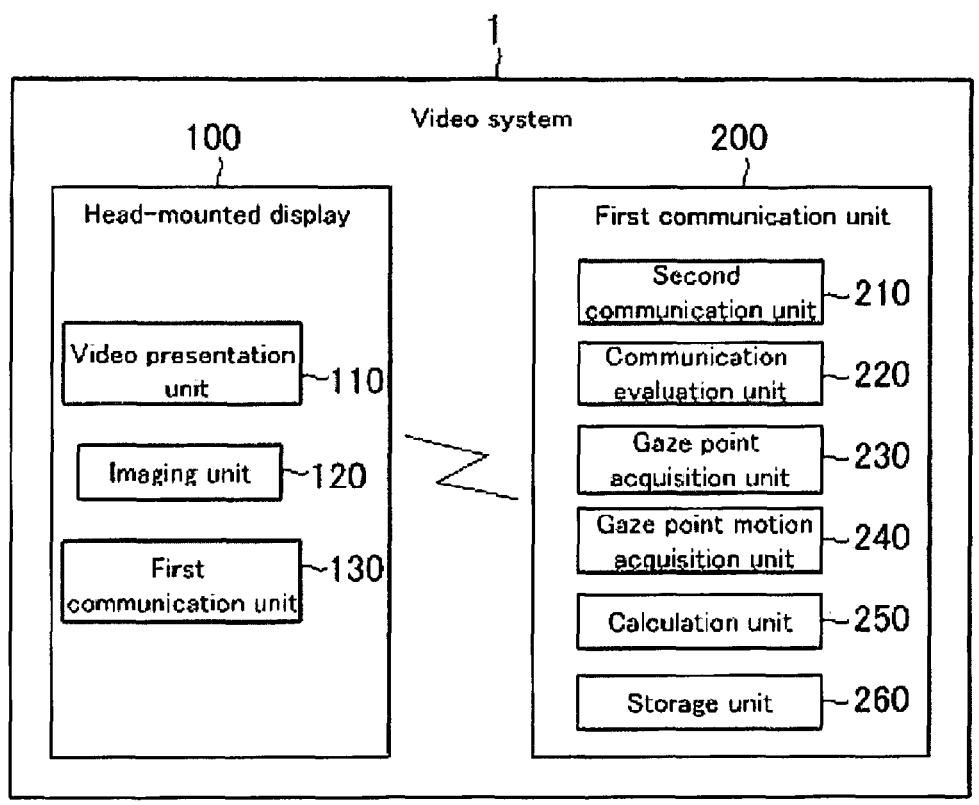
FIG. 2 is a block diagram illustrating an example configuration of the video system according to the first embodiment.

FIG. 2 is a block diagram illustrating the configuration of the video system 1 according to the embodiments. The head-mounted display 100 comprises a video presentation unit 110, an imaging unit 120, and a first communication unit 130.

Video presentation unit 110 presents a video to the user 300. The video presentation unit 110 may, for example, be implemented as a liquid crystal monitor or an organic EL (electroluminescence) display. The imaging unit 120 captures images of the user's eye. The imaging unit 120 may, for example, be implemented as a CCD (charge-coupled device), CMOS (complementary metal oxide semiconductor) or other image sensor disposed in the housing 150. The first communication unit 130 provides a wireless or wired connection to the video generating device 200 for information transfer between the head-mounted display 100 and the video generating device 200. Specifically, the first communication unit 130 transfers images captured by the imaging unit 120 to the video generating device 200, and receives video from the video generating device 200 for presentation by the video presentation unit 110. The first communication unit 130 may be implemented as, for example, a Wi-Fi module, a Bluetooth (registered trademark) module or another wireless communication module.

Next, the video generating device 200 shown FIG. 2 will be introduced. The video generating device 200 comprises a second communication unit 210, a first communication evaluation unit 220, a gaze point acquisition unit 230, a gaze point motion acquisition unit 240, a calculation unit 250, and a storage unit 260. The second communication unit 210 provides a wireless or wired connection to the head-mounted display 100. The second communication unit 210 receives from the head-mounted display 100 images captured by the imaging unit 120, and transmits video to the head-mounted display 100. Herein, "video" refers to video images generated by the calculation unit 250, as described later. The gaze point acquisition unit 230 acquires the user's gaze point P in the video based on images captured by the imaging unit 120. The gaze point P location can be obtained using, for example, well-known gaze detection technologies. For example, the gaze point acquisition unit 230 may obtain in advance calibration information for the relationships between the image display position, the user's eye reference point and a moving point. During video reproduction, at a calibrated time point, the imaging unit 120 captures an image of the eye of the user 300 and, based on the captured image, the gaze point acquisition unit 230 acquires the location information for the reference point and the moving point. Based on the acquired location information and the calibration information acquired in advance, the gaze point acquisition unit 230 estimates the user's gaze point P in the video. Herein, "reference point" refers to a point that has little movement relative to the head-mounted display, such as the inner corner point of the eye, and "moving point" refers to the iris or the pupil, both of which move depending on where the user 300 is looking. Herein, "gaze point P" refers to the user's gaze point as estimated by the gaze point acquisition unit 230.

Figure 3:
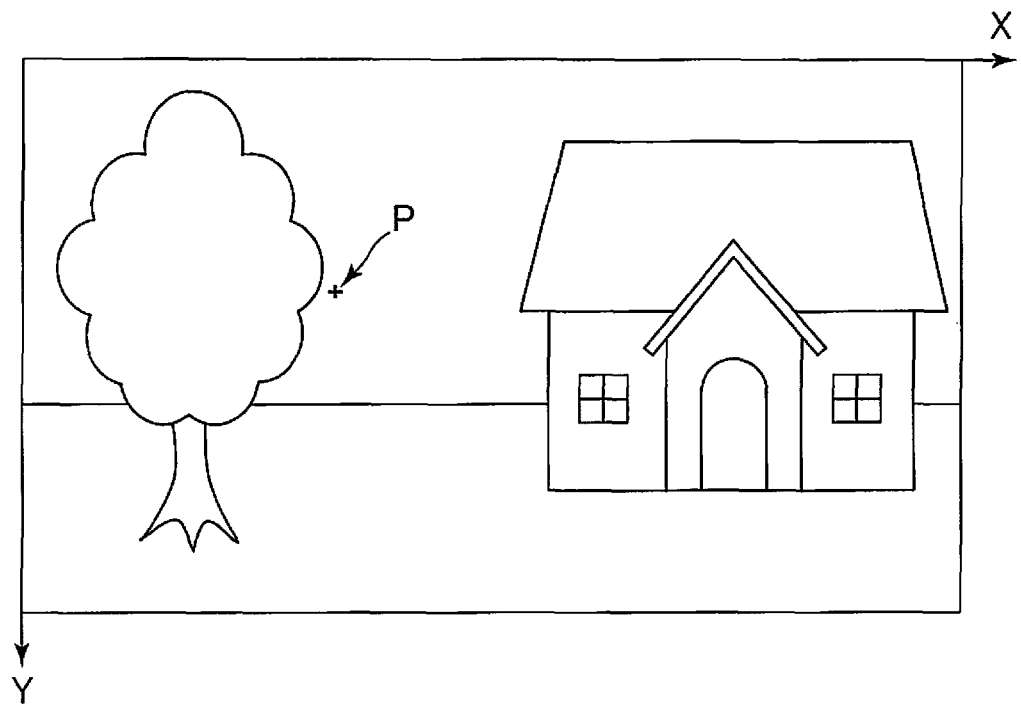
FIG. 3 is a diagram of an example of a user's gaze point acquired by the gaze point acquisition unit according the first embodiment.

FIG. 3 is a schematic diagram illustrating according to the embodiments an example of the gaze point P of the user 300, acquired by the gaze point acquisition unit 230. Three-dimensional objects in a video are in practice displayed by the video presentation unit 110 in two-dimensional Cartesian coordinates using the display elements in the video display area. In FIG. 3, the horizontal direction and the vertical direction in the video display area of the head-mounted display 100 are labeled as the X-axis and the Y-axis, respectively, marking the (x, y) coordination of the gaze point P. As shown in FIG. 3, the location of the gaze point P may be shown on top of the video image that the user is looking at.

Returning to the description of FIG. 2, based on the gaze point P acquired by the gaze point acquisition unit 230, the calculation unit 250 sets a designated region A using the gaze point P as a reference. Outside of the designated region A, in the external region B, the calculation unit 250 generates video with a lower data volume D per unit pixel count than for the designated region A. As explained in detail later, "data volume D per unit pixel count" is a parameter, for example, the data volume D per one pixel, that compares how the processing by the calculation unit 250 differs for the designated region A and the external region B for the video images generated by the video generating device 200 and sent to the head-mounted display 100.

Figure 4:
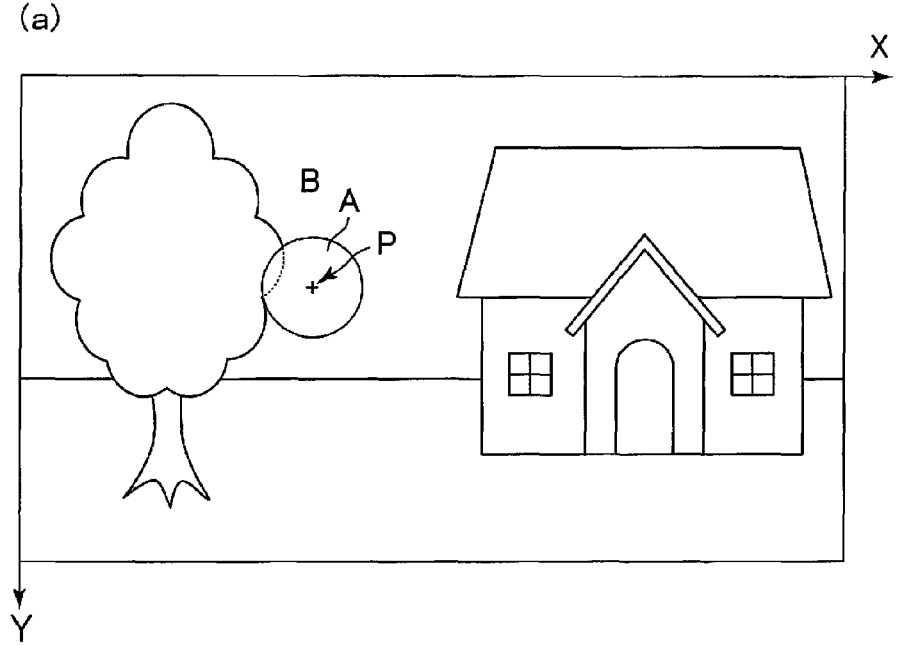
FIGS. 4 (a)-(b) are diagrams of exemplary designated regions set by the calculation unit.
Figure 4:
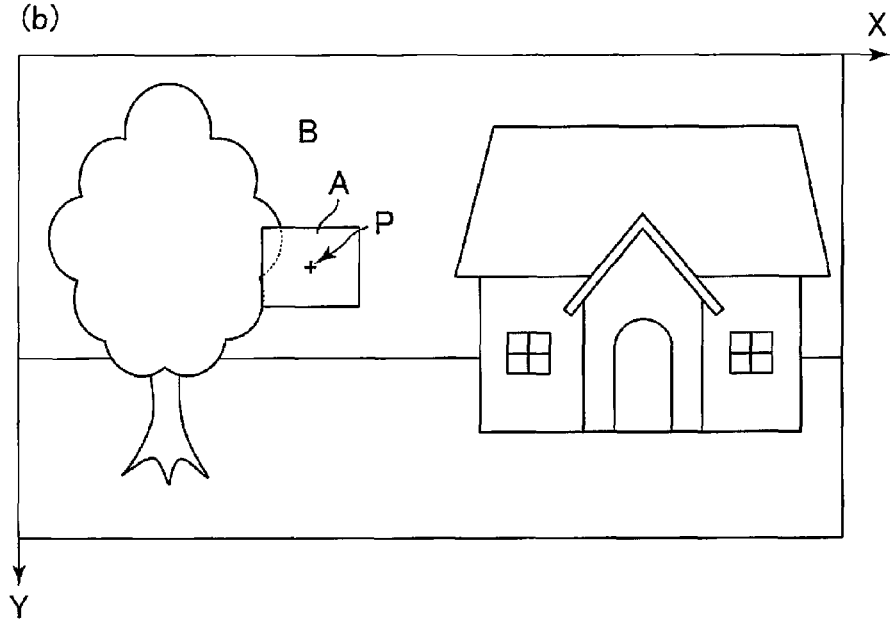
Figure 5:
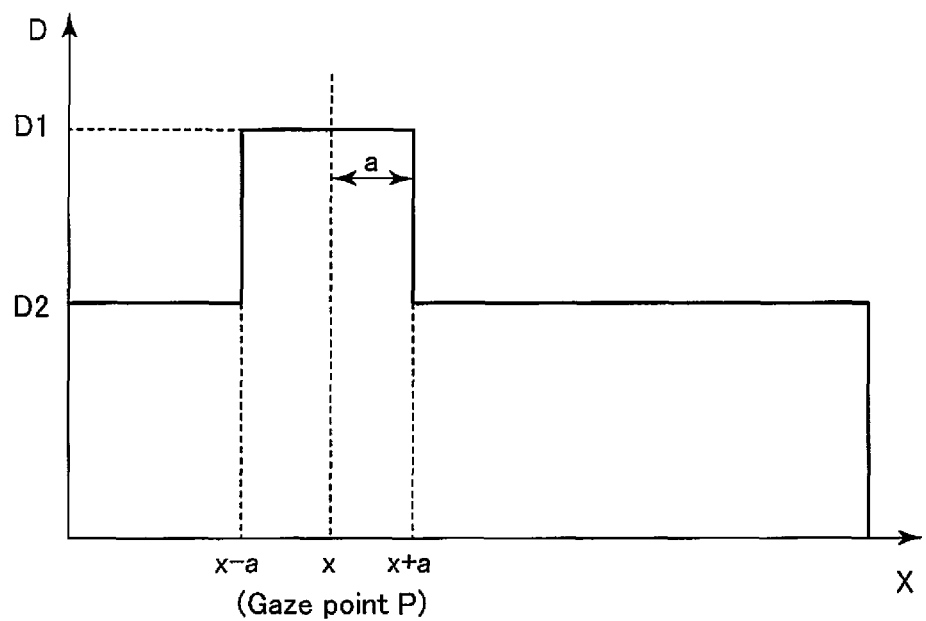
FIG. 5 is a schematic diagram of the relation between the video display area X coordinate and the data volume per unit pixel count.

Next, the process performed by the calculation unit 250 is explained using FIG. 4 and FIG. 5. FIGS. 4 (*a*) and (*b*) are schematic illustrations of designated region A configurations used by the calculation unit 250. FIG. 4 (*a*) explains a case where the calculation unit 250 sets the region within a distance 'a' of the gaze point P as the designated region A. The designated region A can be any closed region, an example of a circular shape is shown in FIG. 4 (*a*) and a rectangular shape in FIG. 4 (*b*). If the designated region A has such a simple shape, more simple calculations are needed for the calculation unit 250 to set the designated region A depending on the motion of the gaze point P.

In general, human visual acuity is higher in the central region that includes the fovea but falls off sharply as the distance from the fovea increases. It is known that the extent of acute vision in humans extends to no more than 5° from the central fovea. The calculation unit 250 may, therefore, estimate the distance between the display elements in the head-mounted display 100 and the fovea of the eye of the user 300 and, using the gaze point P of the user 300 as a reference, set the designated region A in the video display area with a span that corresponds to a region within 5° of the fovea. The size of the designated region A as seen by the user 300 may be determined experimentally while considering the optical system used in the liquid crystal monitor of the head-mounted display 100 and the above-mentioned visual characteristics of a person (for example, central visual acuity, age, viewing angle, etc.).

FIG. 5 shows an example graph of the relation between the X coordinate of the video display area and the data volume D per unit pixel count. The horizontal axis of the graph corresponds to the X coordinate of the video display area and the vertical axis corresponds to the data volume D per unit pixel count, plotted along a line that passes through the gaze point P and is parallel to the X axis. FIG. 5 shows an example where the calculation unit 250 is configured for a designated region A that is within the distance range 'a' of the gaze point P. First, the calculation unit 250 retrieves from among the video data stored in the storage unit 260 the video data of the video that should be shown to the user next. The calculation unit 250 may obtain the video data from outside of the video generating device 200. For X coordinates less than (x−a) or larger than (x+a), the calculation unit 250 calculates the video data at a reduced data volume D per unit pixel count. The method of reducing the data volume may use compression by omitting the high-frequency components of the video, or another well-known method. In this way, a video with a smaller total transferred data volume can be obtained.

An example of a method for omitting the high-frequency components of a video is explained. Specifically, when the calculation unit 250 produces two-dimensional images from the video data of a three-dimensional model, the selected sampling rate may be changed for the inside and for the outside of the designated region A. Outside of the designated region A, the calculation unit 250 reduces the sampling rate for the outside of the designated region A compared to the interior of the designated region A. The calculation unit 250 generates images by an interpolation method for regions that are not sampled. The interpolation process may use, for example, well-known bilinear or spline interpolation. Images produced by this processed are blurred compared to images formed at a high sampling rate for the whole video area. As a result of omitting the high-frequency video components, the compressed data volume becomes smaller. Further, when the sampling rate used for image formation is lowered, the image formation process can be accelerated.

The data volume may also be reduced if the calculation unit 250 generates a video by extracting from the original video only the neighborhood of the gaze area. Further reduction may be achieved for the extracted video if the data volume is set to depend on the distance from the gaze point.

The calculation unit 250 does not need to generate only a single video, a plurality of video images may be generated. For example, a high-resolution video for the extracted region in the vicinity of the gaze point and a low-resolution version of the entire video may be transmitted separately.

In case the gaze point cannot be acquired, the calculation unit 250 may estimate the gaze point from the previous video data. In this case, the gaze point may be estimated from the characteristics of the video data. For example, the calculation unit 250 may estimate the gaze point based on image recognizing of a human face, a car, or another object, the motion vector information on how much an object has moved, or information on which location in the video other users have gazed at in the past for a video with similar characteristics.

The calculation unit 250 may make a rough estimate of the gaze point by acquiring information on the pointing direction and movement of the head-mounted display 100, as detected by a gyroscope or a camera sensor.

Returning to the description of FIG. 2, the first communication evaluation unit 200 evaluates the communication environment between the first communication unit 130 and the second communication unit 210. The calculation unit 250 can reduce the above-mentioned video data volume relative to good communication conditions when the communication environment deteriorates.

Depending on the result of the communication environment evaluation, the calculation unit 250 may reduce the data volume D per unit pixel count for the external region B. For example, the communication environment may be categorized into three levels, starting from the best, C1, C2, and C3, and the corresponding data compression ratios E1, E2, and E3 are stored in the storage unit 260. The first communication evaluation unit 220 determines which level from C1 to C3 the communication environment corresponds to. The calculation unit 250 retrieves from the storage unit 260 the data compression ratio that corresponds to the evaluation result and generates a compressed video for the external region B using the retrieved compression ratio.

The volume of image data transferred from the video generating device 200 to the head-mounted display 100 can thus be adjusted to correspond to the communication environment and video interruptions caused by transfer delays can be avoided. Even when the data volume is reduced, the image quality does not change in the vicinity of the gaze point of user 300, and the level of discomfort imposed on the user 300 can be reduced. Utilizing information on the gaze point P of the user 300, it is thus possible to deliver a video to the user without interruption.

The first communication evaluation unit 220 may evaluate the communication environment based on information that includes the latest data on at least one of the communication parameters comprising field strength, communication speed, data loss rate, throughput, noise level, and the physical distance from a router.

The first communication evaluation unit 220 may monitor the communication parameters and, based on the communication parameters, evaluate if the communication environment is good or bad. The first communication evaluation unit 220 sends messages to the head-mounted display 100 to query the communication status. For example, the first communication unit 130 receives this message, obtains a communication parameter from the side of the head-mounted display 100, and sends the obtained communication parameter to the video generating device 200. The second communication unit 210 then obtains a communication parameter for the side of the video generating device 200. In this way, based on the communication parameters received from the head-mounted display 100 and the communication parameters acquired by the second communication unit 210, the first communication evaluation unit 220 can evaluate if the communication environment is good or bad. Herein, the information on the latest data may be obtained by the first communication evaluation unit 220 by calculating, for example, a moving average of a certain number of previously obtained values. Further, similar to the above-mentioned configuration, the calculation unit 250 may use data compression rate settings that correspond to the communication environment and at any point in time, generate video images having an appropriate data volume for the communication environment. This technology makes it possible to maintain the video frame rate and deliver to the user video that does not cause viewing discomfort, even when the communication environment is poor or the location is such that the conditions may change rapidly.

The gaze point motion acquisition unit 240 may determine the movement of the gaze point P of the user 300 based on the gaze point P acquired by the gaze point acquisition unit 230. The calculation unit 250 changes at least one of the size or the shape of the designated region A, depending on the movement of the gaze point P as acquired by the gaze point motion acquisition unit 240.

Figure 6:
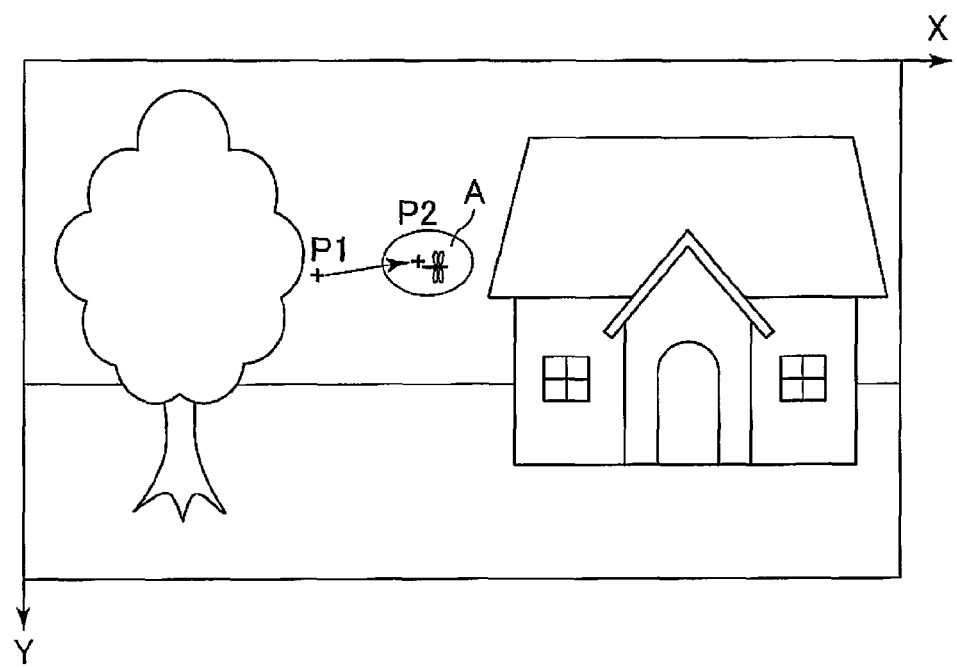
FIG. 6 is a diagram showing an example of the gaze point motion acquired by the gaze point motion acquisition unit according to the first embodiment.

FIG. 6 illustrates according to an embodiment the movement of the gaze point P acquired by the gaze point motion acquisition unit 240. FIG. 6 illustrates a case where the user's gaze point P moves from P1 to P2. The calculation unit 250 configures the designated region A using as reference the gaze point P acquired by the gaze point acquisition unit 230 and the movement of the gaze point P obtained by the gaze point motion acquisition unit 240. In the example shown in FIG. 6, the gaze point P is located at P2 and the gaze point motion direction is shown with an arrow. The designated region A does not need to be centered at the gaze point P. For example, as shown in FIG. 6, the boundaries of the designated region A, set by the calculation unit 250, do not need to be equidistant relative to the gaze point P2, the designated region A may cover a wider area in the gaze point P motion direction. By using a wider span for the direction in which the gaze of the user 300 is pointing, the head-mounted display 100 can preserve the image quality of the video delivered to the user 300. As was explained earlier, the shape of the designated region A may be circular or rectangular, as shown in FIGS. 4(*a*) and (*b*).

The calculation unit 250, when selecting a designated region A shape that has a major axis and a minor axis or a long edge and a short edge, the direction of the major axis or the long edge of the designated region may be set according to the movement direction of the gaze point P.

In FIG. 6, the calculation unit 250 configured the designated region A to have an elliptic shape. The calculation unit 250 sets elliptic shape of the designated region A based on the movement of the gaze point P that was acquired by the gaze point motion acquisition unit 240. For example, the calculation unit 250 may set the direction of the major axis of the ellipse along the gaze point P motion direction while setting the position of the designated region A in reference to the gaze point P. In this case, the ellipse may be positioned relative to the gaze point P in such a way that the gaze point P is not necessarily at the center of the ellipse, but is disposed within the elongated elliptic shape on the side of the forward motion direction of the gaze point P. The video presentation unit 110 can thus maintain during presentation a uniform video quality in directions of small motion and in directions of large motion of the gaze point P. As long as the shape of the designated region A configured by the calculation unit 250 has a major axis and a minor axis or a long edge and a short edge, the shape is not limited to the above-mentioned elliptic shape. For example, for a compression method that uses block-by-block compression of a plurality of pixels per block, it is simpler to calculate which blocks are within the designated region A and which blocks overlap with the boundary of the designated region A if the calculation unit 250 is configured for a rectangular designated region A shape compared to an elliptic shape.

Outside of the designated region A, the calculation unit 250 may adjust the data volume D per unit pixel count depending on the distance from the gaze point P.

Figure 7A:
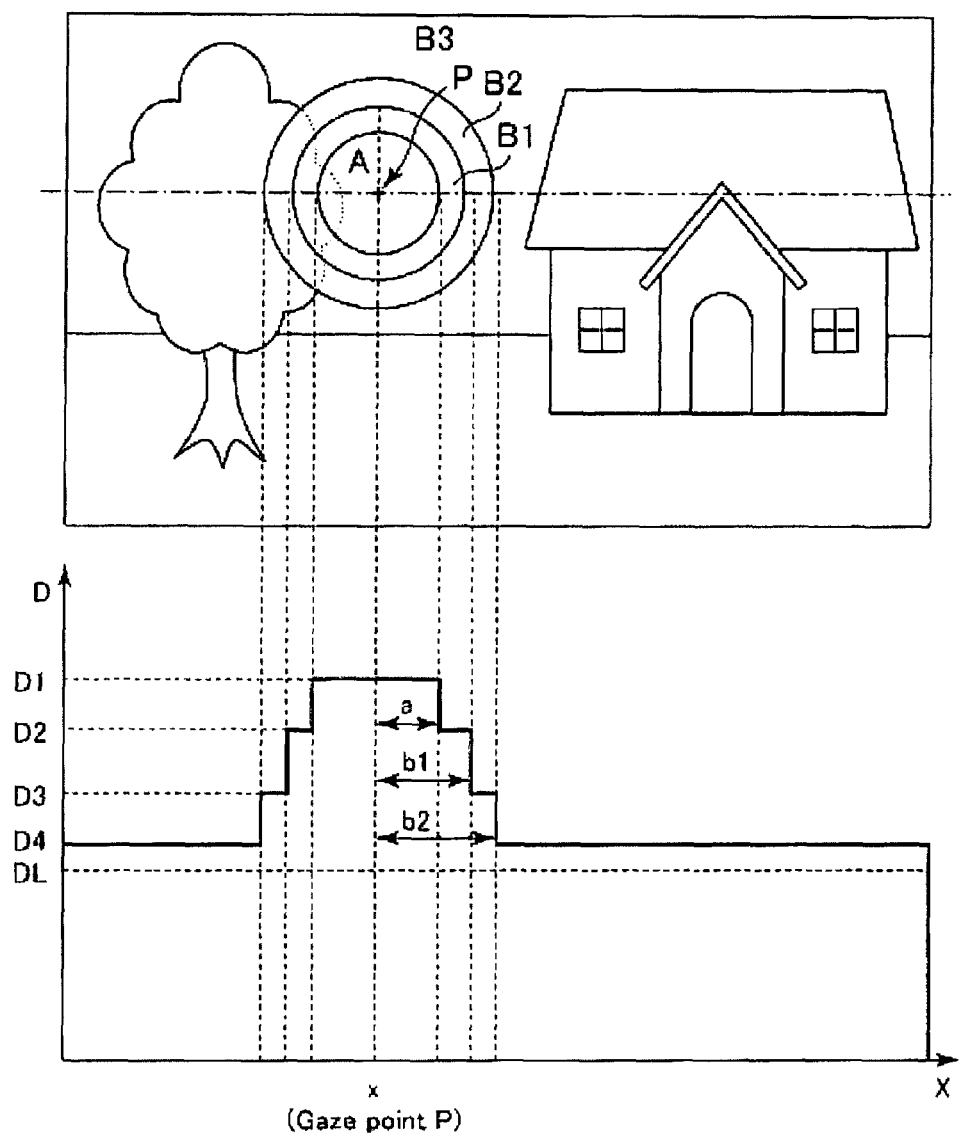
FIG. 7(a) is a schematic diagram of another example of the relation between the video display area X coordinate and the data volume per unit pixel count.

FIG. 7 (a) is schematic diagram showing the relation between the X coordinate of the image display area and the data volume D per unit pixel count, wherein the data volume change is divided into a plurality of steps. The lower graph in FIG. 7 (a) shows how the data volume D per unit pixel count changes at points marked with dotted lines in the upper plot of the video display area. The example in FIG. 7 (a) shows how the calculation unit 250 configures the designated region A in reference to the gaze point P. Additional boundaries are defined such that the boundary of the designated region A is surrounded by the first external region B1, wherein region B1 is surrounded by the second external region B2. The region outside of the boundary of the second external region B2 is defined as B3. Compared to an undivided external region B, the change in the image quality at the boundary between the designated region A and the outside region B can be made smaller when the external region B is divided into a plurality of regions. Thus, compared to the case when the external region B is not divided into a plurality of regions, the video system 1 shown in FIG. 7(a) can deliver to the user 300 a video that matches the human visual perception and has a reduced data volume.

The calculation unit 250 may generate a video wherein the data volume D per unit pixel count becomes progressively smaller outside of the designated region A as a function of distance from the gaze point P.

Figure 7B:
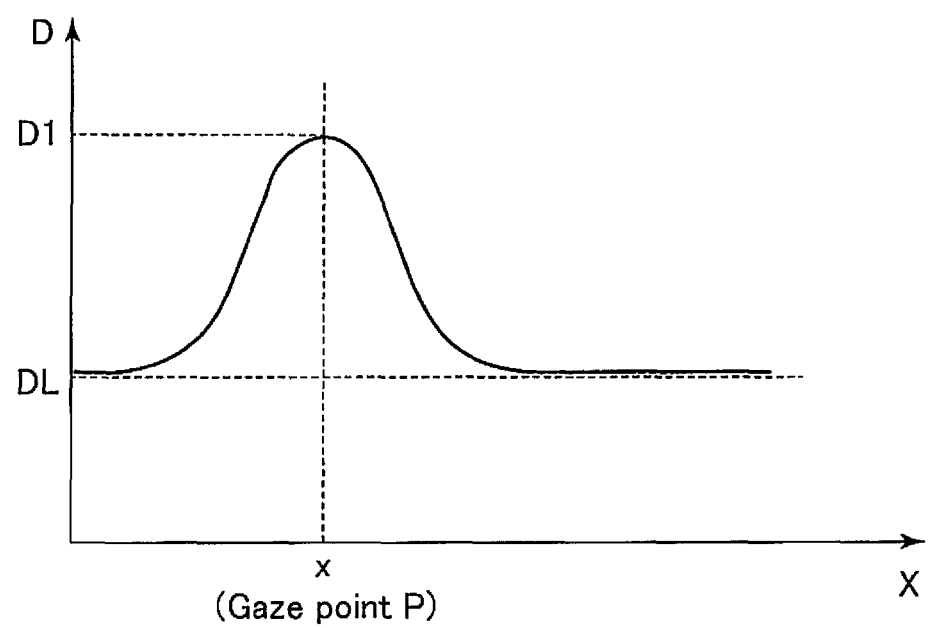
FIG. 7(b) is a schematic diagram of another example of the relation between the video display area X coordinate and the data volume per unit pixel count.

FIG. 7(b) illustrates a case where the data volume D per unit pixel count changes continuously as a function of the video display area coordinate X. In FIG. 7(b), the calculation unit 250 is configured for continuous gradations in the data volume per unit pixel count for both horizontal and vertical axes. The image quality difference caused by a change of the data volume D per unit pixel count becomes smaller at the region boundary and a smooth image can thus be obtained.

The calculation unit 250 may generate a video for which the data volume D per unit pixel count is not allowed to fall below a lower limit DL.

FIGS. 7(a) and (b) show the lower limit DL on the vertical axes that correspond to the data volume D per unit pixel count. In general, if animation data is processed to reduce the data volume, depending on the method used, distinctive movement may occur especially in the vicinity of object boundaries. It is also generally known that the visual acuity of the human eye deteriorates for peripheral vision but, on the other hand, vision becomes more sensitive to movement. To avoid generating video with such artifacts, the calculation unit 250 uses the lower limit DL as a reference for generating video. The video system 1 can thus deliver to the user 300 a video that reduces discomfort even in the peripheral vision region. The specific lower limit DL value used by the image display unit in the head-mounted display 100 and the video generating device 200 may be determined experimentally.

Figure 8:
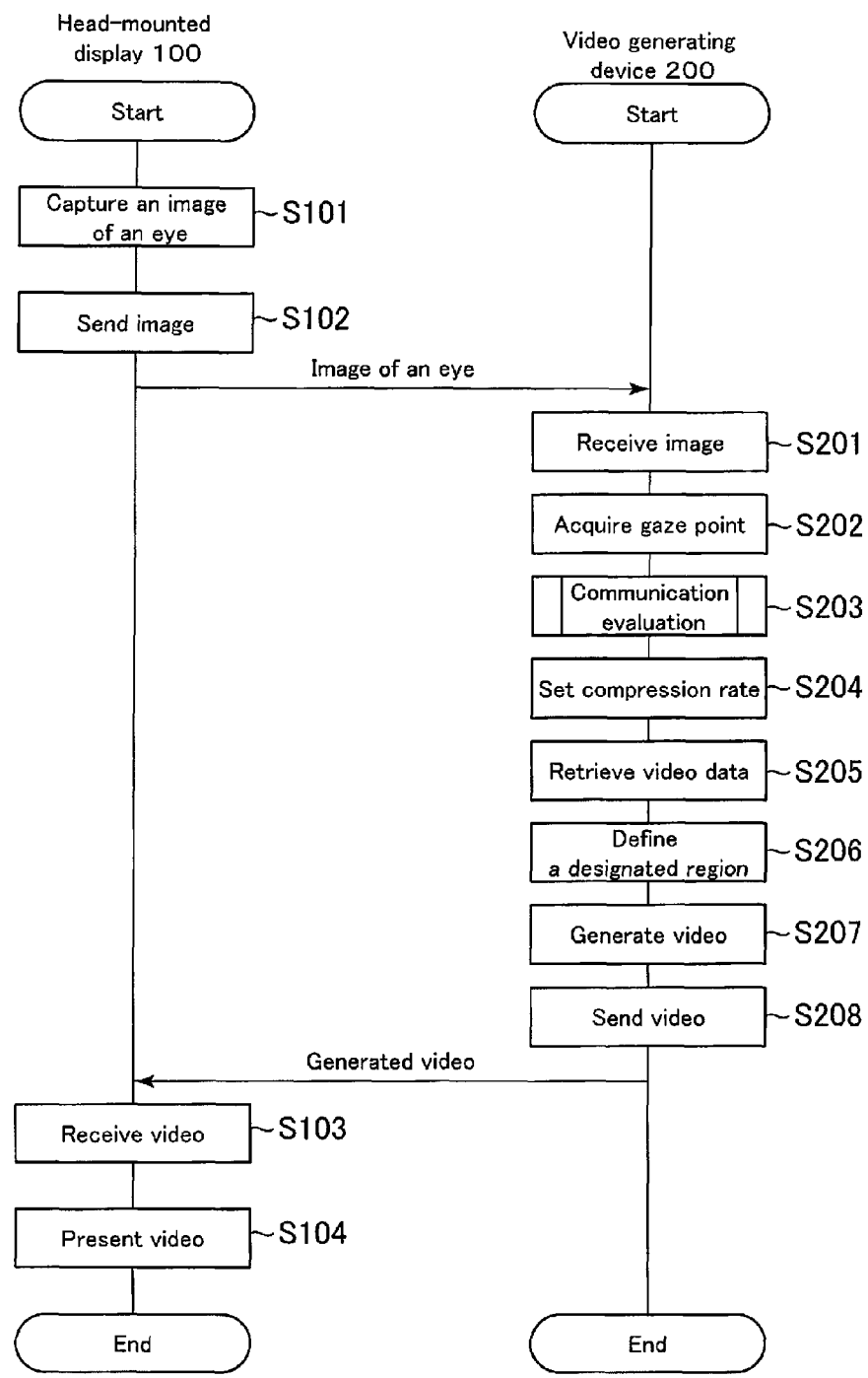
FIG. 8 is an example sequence diagram describing the operation of the video system according to the first embodiment.

In the following, an example of the use of the present embodiment is explained in reference to FIGS. 8 and 9. FIG. 8 is a sequence diagram explaining the main process flow in the head-mounted display 100 and the video generating device 200 according to the present embodiment. First, the user 300 mounts the head-mounted display 100 and views the video presented by the video presentation unit 110. The imaging unit 120 captures (S101) images of the eye of the user 300, and the first communication unit 130 sends (S102) the image to the video generating device 200.

The second communication unit 210 in the video generating device 200 receives (S201) the image of the eye from the head-mounted display 100. The gaze point acquisition unit 230 acquires (S202) the gaze point of the user 300 on the basis of the image. The first communication evaluation unit 220 then evaluates (S203) the communication environment based on the communication parameters. The details of the first communication evaluation unit will be presented later. Based on the evaluation results of the first communication evaluation unit 220, the calculation unit 250 then sets the data compression ratio (S204). The calculation unit 250 retrieves from the storage unit 260 the video data for the video that will be presented to the user at that point (S205). Next, the calculation unit 250 obtains information on the gaze point P from the gaze point acquisition unit 230 and, using the gaze point P as a reference, configures the designated region A (S206). The calculation unit 250 generates for the external region B a video with a lower data volume D per unit pixel count than was used for the video computed for the designated region A (S207). While generating video with a low data volume, the calculation unit 250 determines the data volume D for the external region B, referencing the compression ratio that was set based on the communication result. The second communication unit 210 then sends (S208) the video generated by the calculation unit 250 to the head-mounted display 100. The first communication unit 130 of the head-mounted display 100 receives the generated video (S103) and the video presentation unit 110 presents (S104) the video to the user 300.

Figure 9:
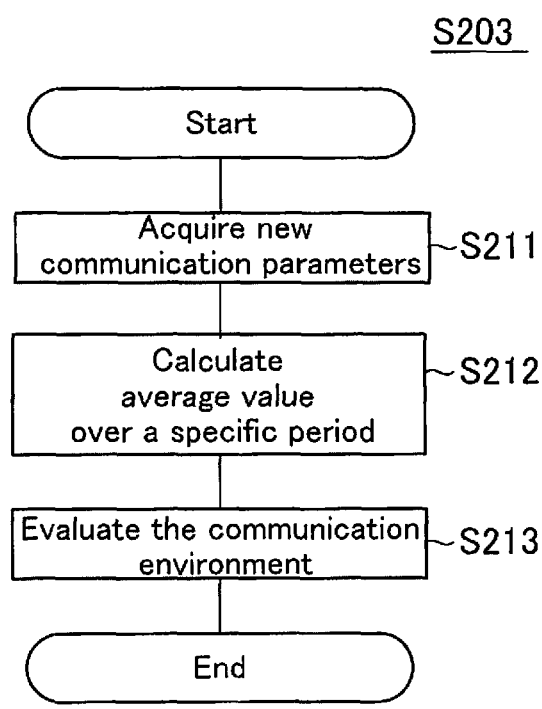
FIG. 9 is an example flowchart of the process related to communication evaluation according to the first embodiment.

FIG. 9 is a flowchart illustrating according to the present embodiment an example of the processing in the first communication evaluation unit. The first communication evaluation unit 220 acquires the latest data (S211) for at least one communication parameter, wherein the parameters comprise, for example, field strength, communication speed, data loss rate, throughput, noise level, and the physical distance from a router. The first communication evaluation unit 220 then uses the latest acquired data to calculate an average value of the communication parameters over a predetermined past time period (S212). Next, the first communication evaluation unit 220 evaluates the communication environment based on the calculated average values (S213). The video system 1 repeats the process described in FIGS. 8 and 9 for the duration of the video reproduction. As explained above in relation to S213, the communication environment evaluation may be done on the basis of the latest communication parameter data from the side of the head-mounted display 100 and from the side of the video generating device 200.

As was explained above, based on the embodiments, to maintain the image quality of the video in the vicinity of the gaze point P, which is where the user is looking at, the image quality may be reduced farther from the gaze point P, thereby reducing the data volume that is transferred from the video generating device 200 to the head-mounted display 100 and enabling a video that causes minimal discomfort to be presented to the user. Reducing the transferred data volume when the communication environment deteriorates can be used to reduce the effects of data transfer latency that would otherwise be caused by the communication environment deterioration. Therefore, the video system 1 of the present invention is best suited for devices using interactive communication by user 300 in, for example, applications, games, etc. running on game machines, computers, or mobile devices.

The abovementioned explanations were based on the embodiments of the present invention. These embodiments are illustrative, it can be readily understood by a person skilled in the art that various modifications may be made by combining the aforementioned components or processes in various ways, which are also encompassed in the scope of the present invention.

The abovementioned explanations were based on the embodiments of the present invention. These embodiments are illustrative, it can be readily understood by a person skilled in the art that various modifications may be made by combining the aforementioned components or processes in various ways, which are also encompassed in the scope of the present invention.

The above explanations were given for the case where the gaze point acquisition unit 230 is implemented inside the video generating device 200. However, implementations are not limited to the case where the gaze point acquisition unit 230 is a part of the video generating device 200. For example, the gaze point acquisition unit 230 may be integrated in the head-mounted display 100. In this case, the head-mounted display 100 is given a control function, wherein the control function is provided in the head-mounted display 100 by implementing a program that performs the processing carried out in the gaze point acquisition unit 230. Since the transfer from the head-mounted display 100 to the video generating device 200 of images of the eye of the user 300 can in this way be omitted, the video system 1 can conserve the communication bandwidth and it is possible to accelerate the processing.

Second Embodiment

Figure 10:
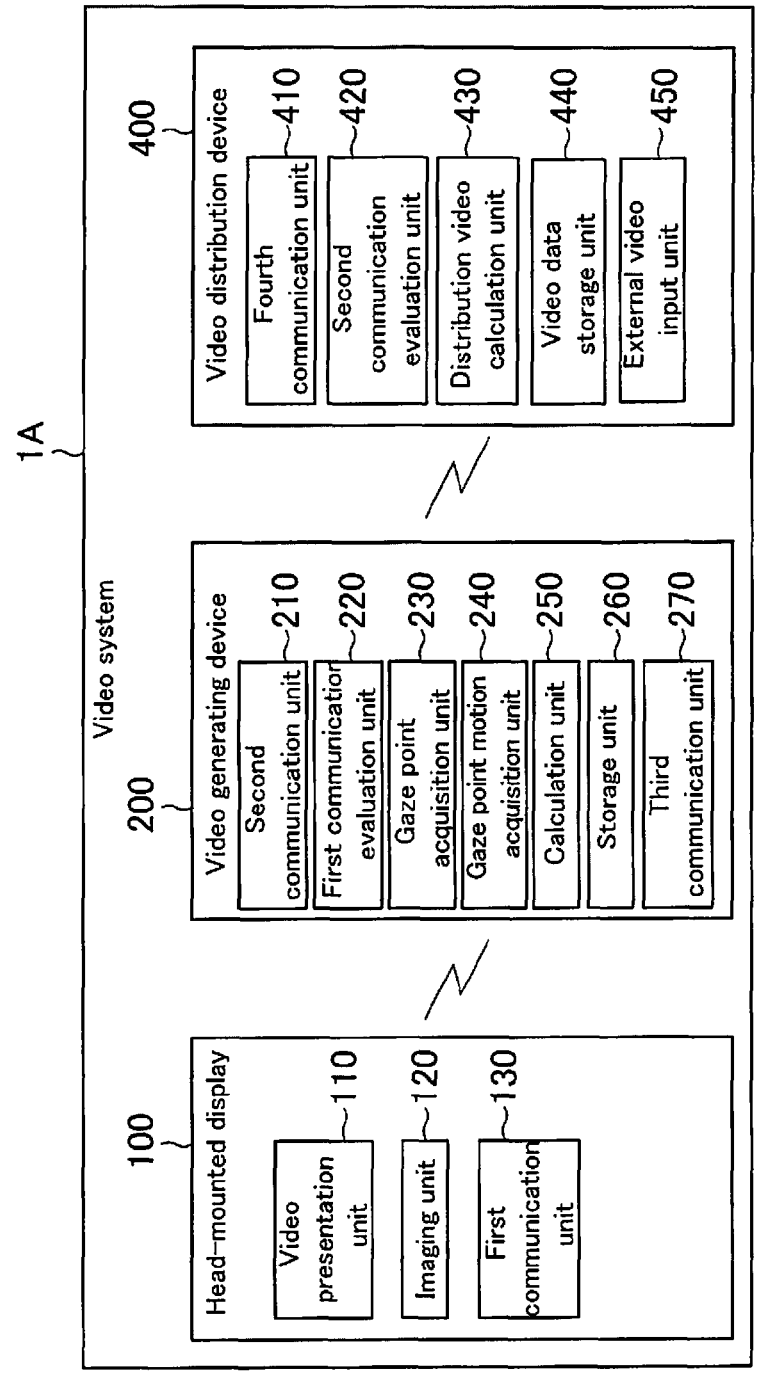
FIG. 10 is a block diagram illustrating a configuration example of the video system according to the second embodiment.

An outline of the second embodiment of the invention is explained. FIG. 10 shows a block diagram illustrating a configuration example of a video system 1A according to the second embodiment. The video system 1A comprises the head-mounted display 100, the video generating device 200 and a video distribution device 400.

As shown in FIG. 10, the head-mounted display 100 comprises the video presentation unit 110, the imaging unit 120 and the first communication unit 130. The structure of the head-mounted display is the same as the example shown in FIG. 2.

The video generating device 200 comprises the second communication unit 210, the first communication evaluation unit 220, the gaze point acquisition unit 230, the gaze point motion acquisition unit 240, the calculation unit 250, the storage unit 260, and a third communication unit 270. Compared to the example shown in FIG. 2, the different point of this video generating device 200 is that it further comprises the third communication unit 270. The third communication unit 270 provides a wireless or wired connection to the video distribution device 400.

The video distribution device 400 comprises a fourth communication unit 410, a second communication evaluation unit 420, a distribution video calculation unit 430, a video data storage unit 440, and an outside video input unit 450.

The fourth communication unit 410 is equipped with a wireless or a wired connection to the video generating device 200. The fourth communication unit 410 delivers video data to the video generating device 200. In addition to the video data, the fourth communication unit 410 may include in the data transfer the user's gaze point information corresponding to the video data being transferred. The fourth communication unit 410 receives the user's gaze point from video generating device 200. In addition to the gaze point information, the fourth communication unit 410 may send information on the video generating device side communication environment, the computational load, etc.

The second communication evaluation unit 420 evaluates the communication environment between the third communication unit 270 and the fourth communication unit 410.

Based on the gaze point received by the fourth communication unit 410, the distribution video calculation unit 430 sets the designated region A using the received gaze point P as a reference, and generates video for the outside of the designated region at a data volume per unit pixel count that is lower than for the designated region. In case the second communication evaluation unit 420 evaluates the communication environment as having deteriorated, corresponding to condition 1, the distribution video calculation unit 430 may reduce the video data volume compared to the case when the communication environment is evaluated as being good, corresponding to condition 2. The video distribution calculation unit 430 may perform the calculations the same way as was described above for the calculation unit 250 in reference to FIG. 2.

The video data storage unit 440 stores the video data used for video distribution. The video data stored in the video data storage unit 440 is high resolution data.

The external video input unit 450 accepts video data from image capturing devices or other video distribution devices. The video capturing device may, for example, be a capturing device capable of capturing 360 degree panoramic video images.

Figure 11:
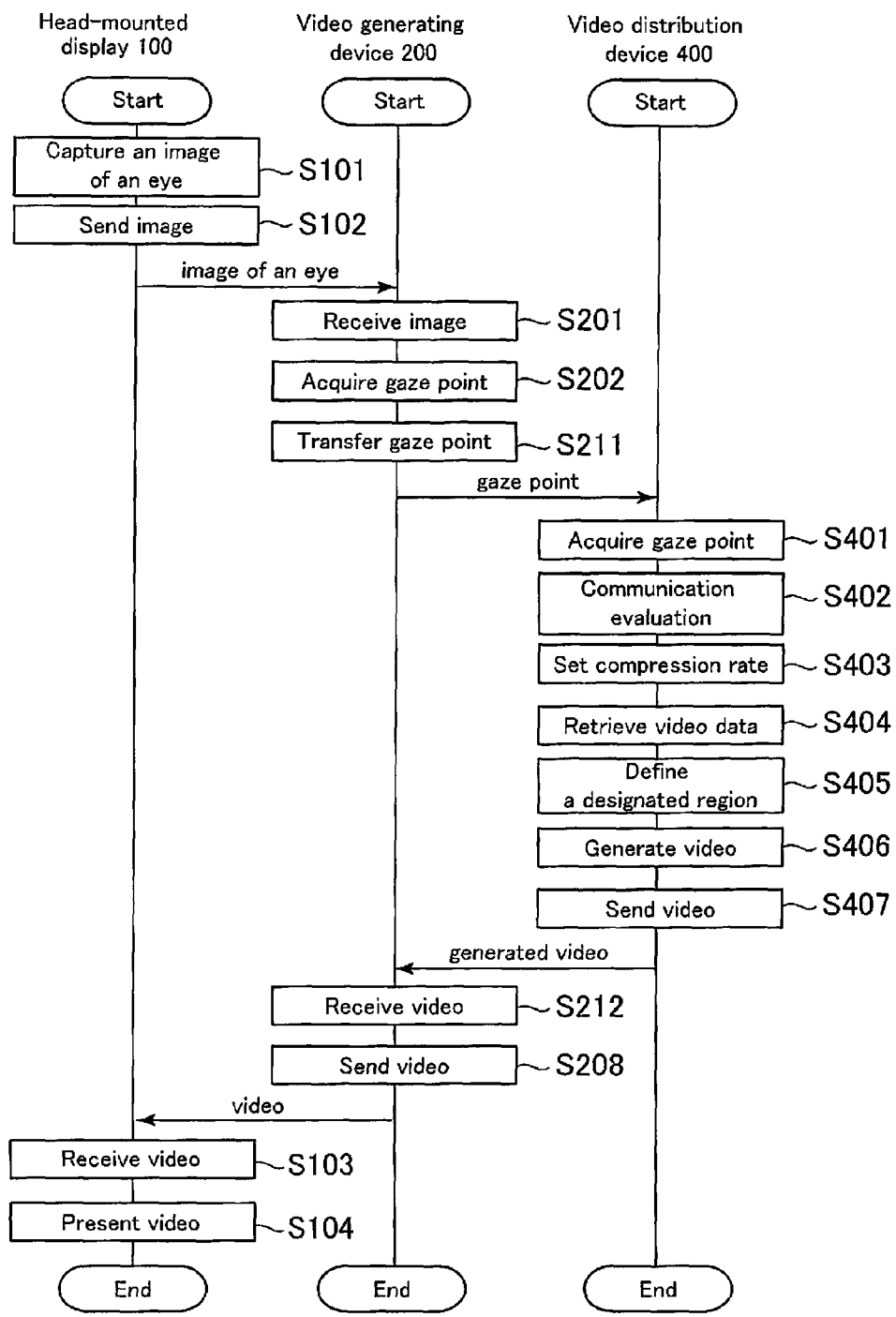
FIG. 11 is an example sequence diagram describing the operation of the video system according to the second embodiment.
Figure 12:
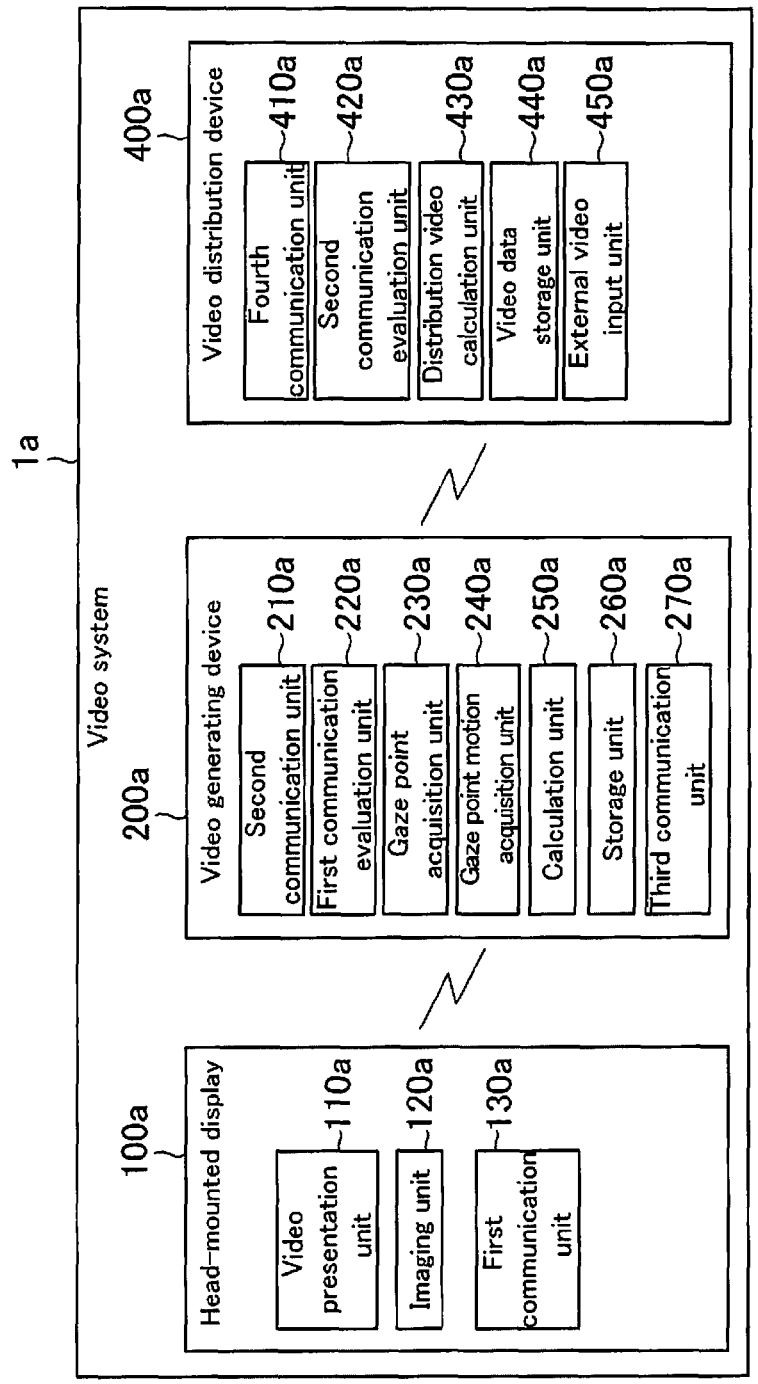
FIG. 12 is a circuit diagram of an example circuit configuration of the video system according to the second embodiment.

Hereinafter, an application example of the present embodiment is explained in reference to FIG. 11. FIG. 11 is a sequence diagram illustrating, according to the embodiment, the main process flow for the head-mounted display 100, the video generating device 200, and the video distribution device 400. The explanation for FIG. 11 uses the same symbols for the same process steps as were used in the explanation of the process in FIG. 8.

First, the user 300 mounts the head-mounted display 100 and watches the video presented by the video presentation unit 110. The imaging unit 120 captures images of the eye of the user 300 (S101), and the first communication unit 130 sends the images to the video generating device 200 (S102).

The second communication unit 210 in the video generating device 200 receives from the head-mounted display 100 images of the eye (S201). The gaze point acquisition unit 230 acquires the gaze point P of the user 300 based on the images (S202). Also, the third communication unit 270 sends the acquired gaze point P to the video distribution device 400 (S211).

The fourth communication unit 410 in the video distribution device 400 receives the gaze point P from the video generating device 200 (S401). The second communication evaluation unit 420 evaluates the communication environment based on the communication parameters (S402). The details of the communication evaluation in the second communication evaluation unit 420 are omitted because the process is the same as that of the first communication evaluation unit 202 that was explained in FIG. 9. Next, the distribution video calculation unit 430 sets the data compression rate based on the evaluation result of the second communication evaluation unit 420 (S403). The distribution video calculation unit 420 retrieves the video data for the video that is to be presented to the user from the video data storage unit 440 (S404). Next, the distribution video calculation unit 430 sets the designated region A based on the received gaze point P reference (S405). The distribution video calculation unit 430 generates a video for the external region B with a data volume D per unit pixel count that is smaller than the data volume used for the designated region A (S406). While generating video with a low data volume, the video distribution calculation unit 430 determines the data volume D for the external region B by referencing the compression ratio that was set based on the communication result. The fourth communication unit 410 then sends the video generated by the distribution video calculation unit 430 to the video generation device 400 (S407).

The third communication unit 270 in the video generating device 200 receives video from the video distribution device 400 (S212). Also, the second communication unit 210 sends the received video to the head-mounted display 100 (S208).

The first communication unit 130 in the head-mounted display 100 receives the generated video (S103), and the video is presented to the user 300 (S104) by the video presentation unit 100.

As explained above, according to the embodiments, while the image quality of the video in the vicinity of the user's gaze point P is maintained, the image quality may be reduced farther from the gaze point P because this reduces the volume of data that the video generating device 200 transfers to the head-mounted display 100, thereby making it possible to deliver to the user a video that causes less discomfort. Also, by reducing the volume of the transferred data, the effects caused by data transfer delay can be reduced even in case the communication environment deteriorates. Therefore, the video system 1 of the present invention is best suited for devices using interactive communication by user 300 in, for example, applications, games, etc. running on game machines, computers, or mobile devices.

In the example shown in FIG. 11, a video is sent to the head-mounted display 100 from the video generating device 200, wherein the data volume of the video is reduced in the video distribution device 400. In this case, the video generating device 200 does not have to comprise the calculation unit 250 or the storage unit 260. Also the video system 1A is not limited to the above-mentioned example illustrated in FIG. 11. For example, if the video distribution device 400 further comprises the gaze point acquisition unit 230 and the gaze point motion acquisition unit 240, the image distribution device 400 may receive from the video generating device 200 images of the eye and the gaze point acquisition may be performed in the video distribution device 400.

The abovementioned explanations were based on the embodiments of the present invention. These embodiments are illustrative, it can be readily understood by a person skilled in the art that various modifications may be made by combining the aforementioned components or processes in various ways, which are also encompassed in the scope of the present invention.

The abovementioned explanations were based on the embodiments of the present invention. These embodiments are illustrative, it can be readily understood by a person skilled in the art that various modifications may be made by combining the aforementioned components or processes in various ways, which are also encompassed in the scope of the present invention.

The above explanations were given for the case where the gaze point acquisition unit 230 is implemented inside the video generating device 200. However, implementations are not limited to the case where the gaze point acquisition unit 230 is in the video generating device 200. For example, the gaze point acquisition unit 230 may be integrated in the head-mounted display 100. In this case, the head-mounted display 100 is given a control function, wherein the control function is provided in the head-mounted display 100 by implementing a program that performs the processing carried out in the gaze point acquisition unit 230. Since the transfer from the head-mounted display 100 to the video generating device 200 of images of the eye of the user 300 can in this way be omitted, the video system 1A can conserve the communication bandwidth and it is possible to accelerate the processing.

REFERENCE LIST

1: Video system
100: Head-mounted display
110: Video presentation unit
120: Imaging unit
130: First communication unit
150: Housing
160: Fitting harness
170: Headphone
200: Video generating device
210: Second communication unit
220: Communication evaluation unit
230: Gaze point acquisition unit
240: Gaze point motion acquisition unit
250: Calculation unit
260: Storage unit

INDUSTRIAL APPLICABILITY

This invention is applicable to video systems that combine a head-mounted display and a video generating device.

What is claimed is:

1. A video system comprising
a head-mounted display used while secured to the head of a user and
a video generating device for generating a video to be presented to the user by the head mounted display, wherein
the head-mounted display comprises
a video presentation unit for presenting the video to the user,
an imaging unit for capturing an image of an eye of the user, and
a first communication unit for sending the image captured by the imaging unit to the video generating device and for receiving from the video generating device the video for presentation by the video presentation unit; and
the video generating device comprises
a second communication unit for receiving from the head-mounted display the image captured by the imaging unit and sending the video to the head-mounted display,
a gaze point acquisition unit for acquiring the user's gaze point in the video based on images captured by the imaging unit,
a gaze point motion acquisition unit for acquiring the movement of the user's gaze point based on the gaze point acquired by the gaze point acquisition unit, and
a calculation unit for generating the video by
defining a designated region based on the gaze point acquired by the gaze point acquisition unit,
using the gaze point as a reference, to set a designated region having a shape defined by a major axis and a minor axis, or a long edge and a short edge, setting the direction of the major axis or the direction of the long edge of the designated region, depending on the movement direction of the gaze point acquired by the gaze point motion acquisition unit, and generating the video with a reduced video data volume per unit pixel count outside of the designated region, compared to the video calculated for the inside of the designated region.

2. The video system of claim 1, wherein the video generating device further comprises a communication evaluation unit for evaluating the communication environment between the first communication unit and the second communication unit, wherein the calculation unit can, in case the communication environment deteriorates, reduce the data volume of the video compared to the data volume used when the communication environment is good.

3. The video system of claim 2, wherein the communication evaluation unit evaluates the communication environment on the basis of information combining the latest data on one or more communication parameters, comprising field strength, communication speed, data loss rate, throughput, noise level, and the physical distance from a router.

4. A video system of claim 1, wherein the calculation unit adjusts the size, the shape, or both of the designated region depending on the motion of the gaze point.

5. A video system of claim 1, wherein outside of the designated region, the calculation unit generates the video by adjusting the data volume per unit pixel count depending on the distance from the gaze point.

6. A video system of claim 1, wherein outside of the designated region, the calculation unit generates the video by successively reducing the data volume per unit pixel count as the distance from the gaze point increases.

7. A video system of claim 1, wherein the calculation unit generates the video by not allowing the data volume per unit pixel count to fall below a lower limit.

8. A video system comprising
a head-mounted display used while secured to the head of a user,
a video generating device for generating a video to be presented to the user by the head-mounted display, and
a video distribution device for delivering video to the video generating device, wherein
the head-mounted display comprises
a video presentation unit for presenting the video to the user,
an imaging unit for capturing an image of an eye of the user, and
a first communication unit for sending the image captured by the imaging unit to the video generating device and for receiving from the video generating device the video for presentation by the video presentation unit; and
the video generating device comprises
a second communication unit for receiving from the head-mounted display the image captured by the imaging unit and sending the video to the head-mounted display,
a gaze point acquisition unit for acquiring the user's gaze point in the video based on the images captured by the imaging unit,
a gaze point motion acquisition unit for acquiring the movement of the user's gaze point based on the gaze point acquired by the gaze point acquisition unit, and
a third communication unit for sending the gaze point acquired by the gaze point acquisition unit to the video distribution device and receiving the video corresponding to said gaze point from the video distribution device; and
the video distribution device comprises
a fourth communication unit for receiving gaze point information from the video generating device and sending video data corresponding to the gaze point information to the video generating device, and
a distribution video calculation unit for generating the video by
defining a designated region based on the gaze point information received by the fourth communication unit,
using the gaze point as a reference, to set a designated region having a shape defined by a major axis and a minor axis, or a long edge and a short edge,
setting direction of the major axis or the direction of the long edge of the designated region according to the movement direction of the gaze point received by the fourth communication unit, and
generating the video with a reduced video data volume per unit pixel count outside of the designated region, compared to the video calculated for the inside of the designated region.

9. The video system of claim 8, wherein the video distribution device further comprises a second communication evaluation unit for evaluating the communication environment between the third communication unit and the fourth communication unit, wherein the distribution video calculation unit can, in case the communication environment deteriorates, reduce the data volume of the video compared to the data volume used when the communication environment is good.

10. The video system of claim 9, wherein the second communication evaluation unit evaluates the communication environment on the basis of information combining the latest data on one or more communication parameters, comprising field strength, communication speed, data loss rate, throughput, noise level, and the physical distance from a router.

11. A video system of claim 8, wherein the distribution video calculation unit adjusts the size, shape, or both of the designated region depending on the motion of the gaze point.

12. A video system of claim 8, wherein outside of the designated region, the distribution video calculation unit generates the video by adjusting the data volume per unit pixel count depending on the distance from the gaze point.

13. A video system of claim 8, wherein outside of the designated region, the distribution video calculation unit generates the video by successively reducing the data volume per unit pixel count as the distance from the gaze point increases.

14. A video system of claim 8, wherein the distribution video calculation unit generates the video by not allowing the data volume per unit pixel count to fall below a lower limit.

15. A video generating method implemented in a video system comprising
a head-mounted display used while secured to the head of a user, and
a video generating device for generating the video to be presented to the user by the head-mounted display, wherein the video generating method comprises
a video presentation step of presenting the video to the user, performed by the head-mounted display,
an imaging step of capturing an image of an eye of a user, performed by the head-mounted display,
a transmission step of sending to the video generating device the image captured in the imaging step, performed by the head-mounted display,
a reception step of receiving from the video generating device the video for presentation in the video presentation step, performed by the head-mounted display,
a reception step of receiving from the head-mounted display the image captured in the imaging step, performed by the video generating device,
a transmission step of sending the video to the head-mounted display, performed by the video generating device,
a gaze point acquisition step of acquiring the user's gaze point in the video, based on the image captured in the imaging step, performed by the video generating device,
a gaze point motion acquisition step of acquiring the motion of the user's gaze point, based on the gaze point acquired in the gaze point acquisition step, performed by the video generating device, and
a calculation step of generating the video, performed by the video generating device, wherein
based on the gaze point acquired in the gaze point acquisition step,
using the gaze point as a reference, a designated region is set having a shape defined by a major axis and a minor axis, or a long edge and a short edge,
the direction of the major axis or the direction of the long edge of the designated area is set according to the direction of the gaze point motion, acquired in the gaze point motion acquisition step, and
the video is generated with a reduced video data volume per unit pixel count outside of the designated region, compared to the video calculated for the inside of the designated region.

16. A video distribution method implemented in a video system comprising
a head-mounted display used while secured to the head of a user,
a video generating device for generating the video to be presented to the user by the head-mounted display, and
a video distribution device for delivering the video to the video generating device,
wherein the video distribution method comprises
a video presentation step of presenting the video to the user, performed by the head-mounted display,
an imaging step of capturing an image of an eye of a user, performed by the head-mounted display,
a transmission step of sending to the video generating device the image captured in the imaging step, performed by the head-mounted display,
a reception step of receiving from the video generating device the video for presentation in the video presentation step, performed by the head-mounted display,
a reception step of receiving from the head-mounted display the image captured in the imaging step, performed by the video generating device,
a transmission step of sending the video to the head-mounted display, performed by the video generating device,
a gaze point acquisition step of acquiring the user's gaze point in the video, based on the image captured in the imaging step, performed by the video generating device,
a gaze point motion acquisition step of acquiring the motion of the user's gaze point, based on the gaze point acquired in the gaze point acquisition step, performed by the video generating device,
a transmission step of sending the gaze point acquired in the gaze point acquisition step to the video distribution device, performed by the video generating device,
a reception step of receiving from the video distribution device the video corresponding to the gaze point, performed by the video generating device,
a reception step of receiving gaze point information from the video generating device, performed by the video distribution device,
a transmission step of sending to the video generating device the video data that corresponds to the gaze point information, performed by the video distribution device, and
a distribution video calculation step of generating the video, performed by the video distribution device, wherein
based on the received gaze point information,
using the gaze point as a reference, a designated region is set, having a shape defined by a major axis and a minor axis, or a long edge and a short edge,
the direction of the major axis or the direction of the long edge of the designated area is set according to the direction of the received gaze point motion, and
the video is generated with a reduced video data volume per unit pixel count outside of the designated region, compared to the video calculated for the inside of the designated region.

17. A non-transitory computer-readable medium storing a video generating program, executed by a video generating device, for generating a video to be transmitted to a head-mounted display that is used while secured to the head of a user, wherein the program comprises
a function to receive an image capture by the head-mounted display of the user's eye and to transmit the video to the head-mounted display,
a gaze point acquisition function for acquiring the gaze point of the user in the video, based on the image received by the communication unit,
a gaze point motion acquisition function for acquiring the user's gaze point motion, based on the gaze point acquired by the gaze point acquisition function,
a calculation function for generating the video, wherein
based on the gaze point acquired by the gaze point acquisition function,
using the gaze point as a reference,
a designated region is set, having a shape defined by a major axis and a minor axis, or a long edge and a short edge,
the direction of the major axis or the direction of the long edge of the designated area is set according to the direction of the gaze point motion, acquired by the gaze point motion acquisition function, and the video is generated with a reduced video data volume per unit pixel count outside of the designated region, compared to the video calculated for the inside of the designated region.

18. A non-transitory computer-readable medium storing a video distribution program, executed by the video distribution device, for delivering a video to the video generating device that sends the video to the head-mounted display for that is used while secured to the head of a user, wherein the program comprises a fourth communication function for receiving gaze point information from the video generating device and sending video data corresponding to the gaze point information to the video generating device, a distribution video calculation function for generating the video, wherein based on the gaze point information received by the fourth communication unit, using the gaze point as a reference, a designated region is set, having a shape defined by a major axis and a minor axis, or a long edge and a short edge, the direction of the major axis or the direction of the long edge of the designated area is set according to the direction of the gaze point motion, received from the fourth communication unit, and the video is generated with a reduced video data volume per unit pixel count outside of the designated region, compared to the video calculated for the inside of the designated region.

* * * * *